United States Patent
Baartman et al.

(10) Patent No.: US 7,561,178 B2
(45) Date of Patent: Jul. 14, 2009

(54) METHOD, APPARATUS AND COMPUTER PROGRAM PRODUCT FOR SYNCHRONIZING SEPARATE COMPRESSED VIDEO AND TEXT STREAMS TO PROVIDE CLOSED CAPTIONING AND INSTANT MESSAGING INTEGRATION WITH VIDEO CONFERENCING

(75) Inventors: Randall Paul Baartman, Rochester, MN (US); Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 11/225,642

(22) Filed: Sep. 13, 2005

(65) Prior Publication Data

US 2007/0064095 A1    Mar. 22, 2007

(51) Int. Cl.
*H04N 7/14* (2006.01)
*H04L 12/16* (2006.01)
(52) U.S. Cl. .............. 348/14.08; 348/14.12; 348/14.13
(58) Field of Classification Search ... 348/14.01–14.16; 370/260–261; 709/204, 205
See application file for complete search history.

(56) References Cited

U.S. PATENT DOCUMENTS

| | | | | |
|---|---|---|---|---|
| 5,774,857 A | * | 6/1998 | Newlin | 704/271 |
| 6,771,302 B1 | * | 8/2004 | Nimri et al. | 348/14.08 |
| 6,928,165 B1 | * | 8/2005 | Takai | 380/201 |

FOREIGN PATENT DOCUMENTS

GB          2352845 A          7/2001

* cited by examiner

*Primary Examiner*—Melur Ramakrishnaiah
(74) *Attorney, Agent, or Firm*—Joan Pennington

(57) ABSTRACT

A method, apparatus and computer program product are provided for synchronizing separate compressed video and text streams to provide lightweight closed captioning and instant messaging integration with video conferencing. A video encoder encodes a video stream and periodically generates a synchronization frame event. Each generated synchronization frame event has a unique ID. A text recording agent receives the periodically generated synchronization frame events, and generates text packets associating stored text with the synchronization frame event. A video decoder decodes the video stream, periodically generating the synchronization frame event having the unique ID. A text display agent receives the periodically generated synchronization frame events and associates stored text packets with the synchronization frame events.

20 Claims, 9 Drawing Sheets

PRIOR ART

METHOD, APPARATUS AND COMPUTER PROGRAM PRODUCT FOR SYNCHRONIZING SEPARATE COMPRESSED VIDEO AND TEXT STREAMS TO PROVIDE CLOSED CAPTIONING AND INSTANT MESSAGING INTEGRATION WITH VIDEO CONFERENCING

FIELD OF THE INVENTION

The present invention relates generally to the data processing field, and more particularly, relates to a method, apparatus and computer program product for synchronizing separate compressed video and text streams to provide lightweight closed captioning and instant messaging integration with video conferencing.

DESCRIPTION OF THE RELATED ART

Closed captioning was originally designed to make television and movies accessible to deaf people. However, anyone who has been into a bar or restaurant with several TVs have also seen closed captioning replace audio for people with perfectly normal hearing. Closed captioning, like subtitles, can also be used to provide low cost multi-lingual support for movies and videos.

It is not unusual for business people to be occupied with several things at once. Perhaps someone would want to be on a conference call and monitor a video conference at the same time. In this case it would be beneficial to provide closed captioning for video conferences. Unfortunately, current closed captioning methods, used most often for television broadcasting, rely on complex encoders that encode the text data into the video signal.

Various arrangements are known in the art for processing digital video. For example, a MPEG-2 Standard is defined by the Moving Picture Experts Group (ISO/IEC JTC1/SC29/WG11). The standard supports constant and/or variable rate encoding that allows for variable bandwidth and quality of video streams. It also defines a system layer that integrates multiple media sources into a single data stream with integrated time stamps. The Systems layer supports the sending of information encoded using a variety of video and audio data compression techniques such as MPEG1 or MPEG-2 video or audio. In the MPEG-2 standard, each video frame (or field) is classified as an I, P or B frame. An I-frame is intra-frame coded using no reference frames. While P-frames and B-frames are inter-frame predictively coded using some reference frames.

FIG. 1 illustrates a prior art closed captioning arrangement that include a video appliance that encodes closed captions or text data into the video signal, such as a Vbrick MPEG video appliance manufactured by VBrick Systems, Inc., of Wallingford, Conn. The encoded video over IP with closed captioned text is sent over a TCP/IP network. The encoded video is decoded by a Vbrick MPEG decoder that provides display video and display closed captions.

Other methods keep video and sound data separate, for example, DVD subtitles, but both rely on multiple precision, synchronized time sources, to synchronize the text and video signals when recording.

Current offerings for closed captioned video conferencing rely on these technologies and are only offered by a small number of video conferencing service providers, such as, www.polycom.com. This cost and complexity discourages businesses from using closed captioning in most instances as these technologies were designed for TV and movies, rather than a video conferencing application.

A need exists for an effective mechanism for synchronizing separate compressed video and text streams to provide lightweight closed captioning and instant messaging integration with video conferencing. A lightweight method for closed captioning is needed that is easy to use and inexpensive enough to include standard with video conferencing product or service could give the vendor a significant advantage in the market. A need exists for an effective mechanism to cheaply and easily enables customers to closed caption enable their video conferences for hearing impaired or multi-lingual support.

SUMMARY OF THE INVENTION

Principal aspects of the present invention is to provide a method, apparatus and computer program product for synchronizing separate compressed video and text streams to provide closed captioning and instant messaging integration with video conferencing. Other important aspects of the present invention are to provide such method, apparatus and computer program product for synchronizing separate compressed video and text streams to provide closed captioning and instant messaging integration with video conferencing substantially without negative effect and that overcome many of the disadvantages of prior art arrangements.

In brief, a method, apparatus and computer program product are provided for synchronizing separate compressed video and text streams to provide closed captioning and instant messaging integration with video conferencing. A video encoder encodes a video stream and periodically generates a synchronization frame event. Each generated synchronization frame event has a unique ID. A text recording agent receives the periodically generated synchronization frame events, and generates text packets associating stored text with the synchronization frame event. A video decoder decodes the video stream, periodically generating the synchronization frame event having the unique ID. A text display agent receives the periodically generated synchronization frame events and associates stored text packets with the synchronization frame events.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment, a unique method is provided for synchronizing video with closed captioned text, that is easy to implement by simple instrumentation of current encoder and decoder technology. Apparatus for implementing methods of the preferred embodiment consists of an encoder and decoder.

Figure 1:
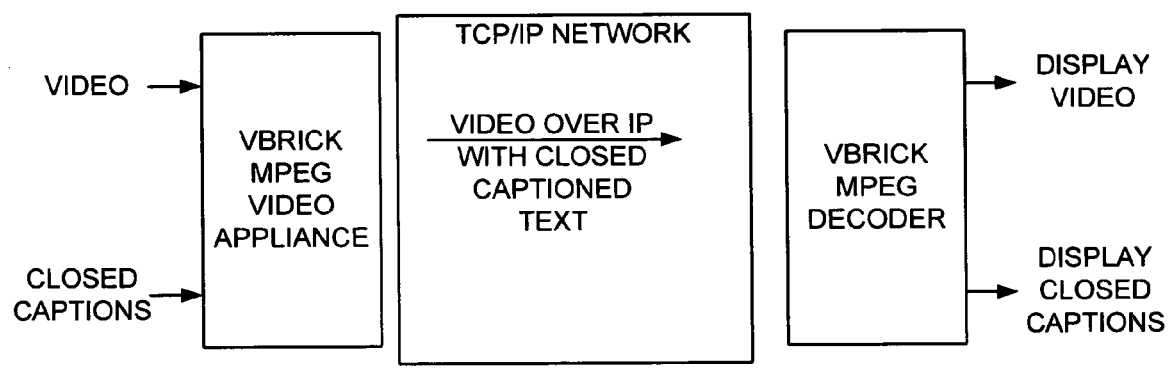
FIG. 1 is block diagram illustrating a prior art closed captioning arrangement.
Figure 2:
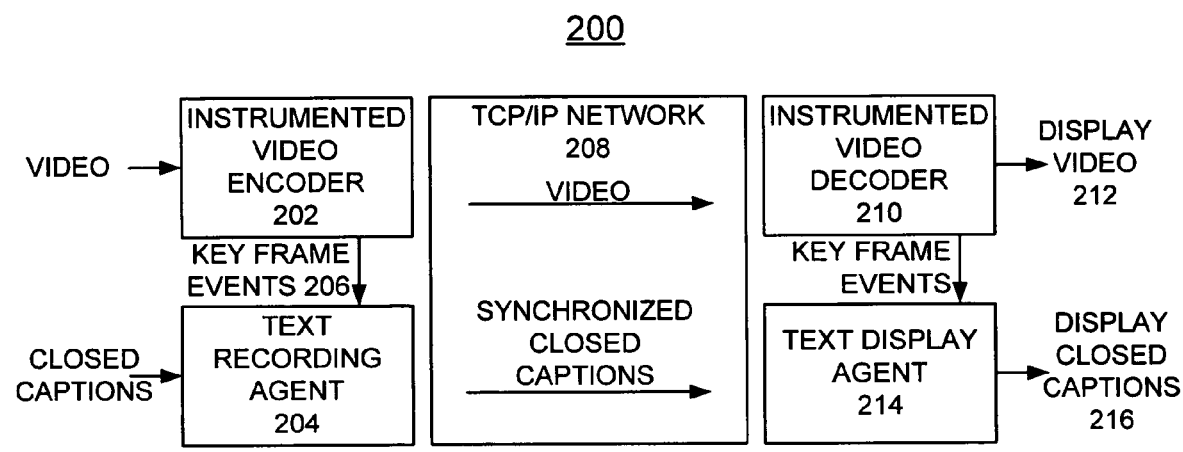
FIG. 2 is block diagram illustrating closed captioning apparatus in accordance with the preferred embodiment.

Having reference now to the drawings, in FIG. 2, there is shown closed captioning apparatus generally designated by the reference character 200 in accordance with the preferred embodiment. Closed captioning apparatus 200 includes an instrumented video encoder 202 receiving a video signal and coupled to a text recording agent 204 receiving closed captions.

Instrumented video encoder 202 is a normal streaming video encoder except that encoder 202 fires an event whenever it encodes a key frame in accordance with the preferred embodiment. A key frame is a concept used in video encoding algorithms, such as MPEG. Instrumented video encoder 202 applies the key frame events 206 to the text recording agent 204. Instrumented video encoder 202 in accordance with the preferred embodiment is further illustrated and described with respect to FIG. 3.

In accordance with features of the preferred embodiment, the key frame concept is used in the closed captioning apparatus 200 for a synchronization frame. For video compression algorithms that do not use key frames, the encoder 202 can insert an informationless synchronization frame into the video stream at regular intervals. The important thing is that the encoder can fix on a frame every X number of frames. When a key frame is encoded, or a synchronization frame is inserted, the encoder 202 fires an event signal. This event signal contains a unique ID, such as a hash or timecode, for the key frame or synchronization frame event.

The text recording agent 204 in accordance with the preferred embodiment records the audio of the conference, for example, via voice recognition software or manual typed input and holds this text in a buffer. The text recording agent 204 in accordance with the preferred embodiment is further illustrated and described with respect to FIG. 4.

In accordance with features of the preferred embodiment, the text recording agent 204 listens for synchronization frame events 206 from the encoder. When an event 206 is encountered the text currently in the buffer is associated with the unique ID for the key frame. Since manually entered text, or slow voice processing, may be delayed relative to the video, the text recording agent 204 has the ability to stagger the association by a set number of frames. That is, when a key frame event 206 is read, the unique ID is put into a queue of a specific size. This queue needs to fill up before text starts to be associated with frames. In this way text is associated with frames, for example, recorded a few seconds before the text was typed in. The unique frame ID is used to place each text buffer into a linear data structure that can be streamed alongside the video stream over a transmission control protocol (TCP)/internet protocol (IP) TCP/IP network 208.

Closed captioning apparatus 200 includes a decoder also comprised of two parts, an instrumented streaming video decoder 210, and the text display agent 212. The instrumented decoder 210 is a normal streaming video decoder except that instrumented decoder 210 fires an event whenever instrumented decoder 210 decodes a key frame or synchronization frame 214. This event contains a unique ID that will identify the frame. This unique ID must match the one generated for the frame event 208 by the encoder 202.

In accordance with features of the preferred embodiment, significant improvements are provided over the conventional closed captioned video conferencing support technology that encodes text into the video signal. First, closed captioning apparatus 200 is significantly cheaper to implement since it only requires very simple text recording and playback agents and small instrumentations added to current encoder and decoder technologies. Also, in a multi-lingual application, superior performance is achieved because the text and video streams are separate. For example, to offer closed captioning in 3 different languages, closed captioning apparatus 200 generates 1 video stream and 3 text streams. Current technologies would require encoding and transmitting 3 different video streams, one for each language.

Figure 3:
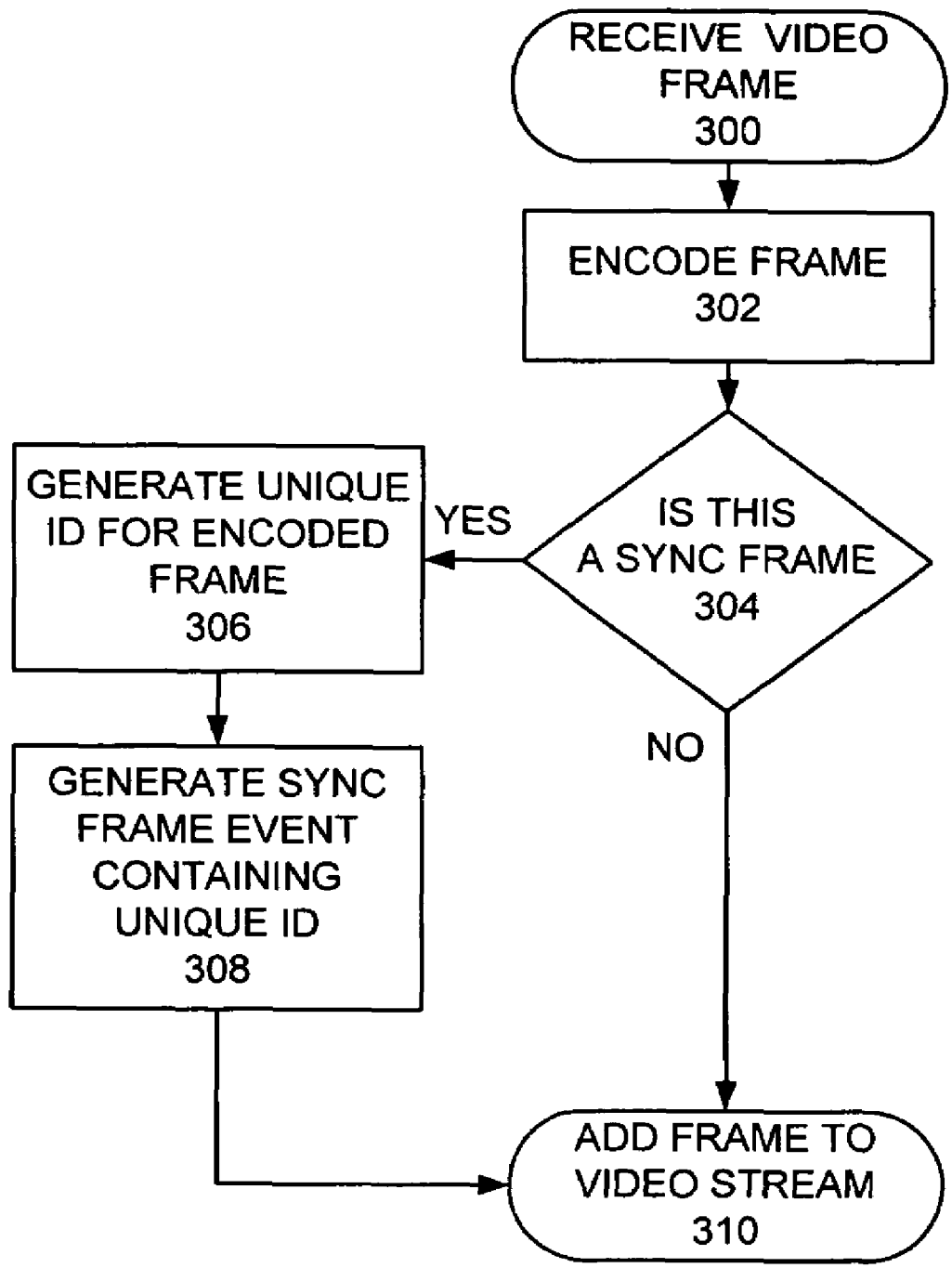
FIGS. 3 and 4 are functional block diagrams respectively illustrating an exemplary instrumented video encoder and an exemplary text recording agent of the closed captioning apparatus of FIG. 2 in accordance with the preferred embodiment.
Figure 4:
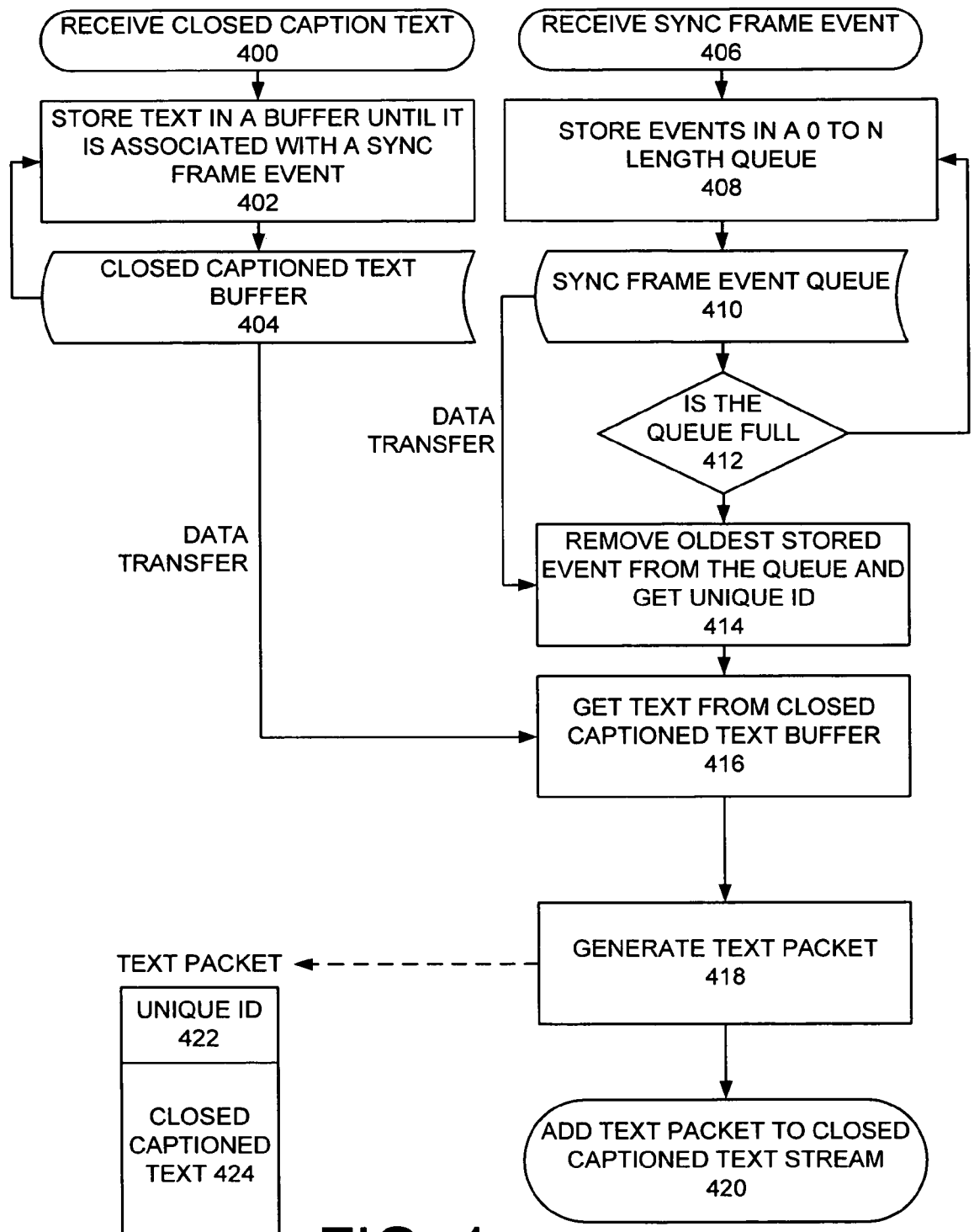

Referring to FIGS. 3 and 4, there are shown functional block diagrams respectively illustrating an exemplary instrumented video encoder 202 and an exemplary text recording agent 204 of the closed captioning apparatus 200 of FIG. 2 in accordance with the preferred embodiment.

Referring now to FIG. 3, instrumented video encoder 202 receives a video frame as indicated in a block 300. Instrumented video encoder 202 encodes the video frame as indicated in a block 302 and checks whether the video frame is a synchronization (sync) frame as indicated in a decision block 304. Instrumented video encoder 202 periodically generates a sync frame, such as every N number of video frames. For example, instrumented video encoder 202 can select a frame to become a sync frame, then continue to generate a sync frame every N number of video frames. Alternatively, with instrumented video encoder 202 implemented by an MPEG type encoder, where I-frames naturally occur, such as every 15 to 30 frames, and can be easily adapted as the sync frames, or 2nd I-frame, or other interval that works best.

For a sync frame identified at decision block 304, a unique ID is generated for the encoded frame as indicated in a block 306. An algorithm the preferred embodiment generates the unique ID using at least a part or all of the encoded frame data as input at block 306. Then under normal operations, when this algorithm the preferred embodiment is applied by the decoder 210 the same unique ID result is obtained. In accordance with features of the preferred embodiment, using some or all of the encoded frame data as input at block 306 to generate the unique ID enables associating text with the sync frame without actually encoding any extra data into the video. A hashing algorithm advantageously can be used to implement the unique ID generation algorithm; however, it should be understood that the present invention is not limited to a hashing algorithm.

A sync frame event containing the unique ID is generated as indicated in a block 308. The generated sync frame event shown as a key frame event 206 in FIG. 2, is applied to the text recording agent 204. Then and when a sync frame not identified at decision block 304, the frame is added to the video stream as indicated in a block 310.

Referring now to FIG. 4, text recording agent 204 receives closed caption text as indicated in a block 400. As indicated in a block 402, the closed caption text is stored in a closed caption text buffer 404 until the closed caption text is associated with a sync frame event 206. Text recording agent 204 receives a sync frame event as indicated in a block 406. As indicated in a block 408 the sync frame events are stored in a 0 to N length queue 410. Checking is performed to determine whether the queue 410 is full as indicated in a decision block 512. If the queue 410 is not full, then storing the sync frame events in the 0 to N length queue continues. If the queue 410 is full, then a data transfer is performed to remove the oldest stored event from the queue and the unique ID for the sync frame event is obtained as indicated in a block 414. A data transfer of text from the closed captioned text buffer block 404 is performed as indicated in a block 416. A text packet is generated as indicated in a block 418 and the text packet is added to the closed captioned text stream as indicated in a block 420. As illustrated, the generated text packet includes a unique ID 422 and closed captioned text 424.

Figure 5:
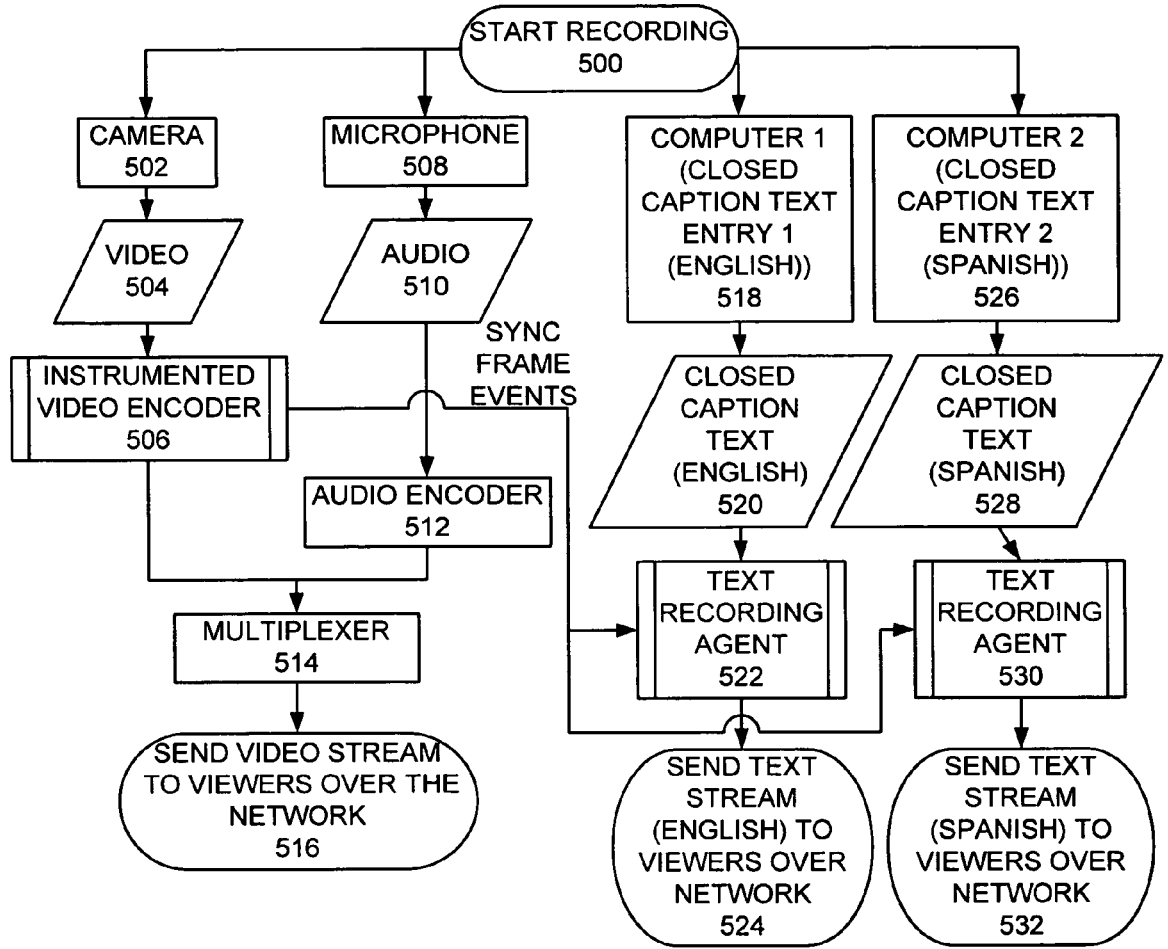
FIG. 5 is a flow chart illustrating exemplary steps for implementing closed captioning in accordance with the preferred embodiment.

Referring now to FIG. 5, there are shown exemplary steps for implementing closed captioning in accordance with the preferred embodiment starting with recording as indicated in a block 500. A camera 502 provides video 504 applied to the instrumented video encoder 202 as indicated in a block 506. A microphone 508 provides audio 510 that is applied to an audio encoder as indicated in a block 512. A multiplexer 514 sends a video stream to viewers as indicated in a block 516.

A computer 1 used for closed caption text entry 1, such as English text as indicated in a block 518 provides closed caption text in English as indicated in a block 520 to the text recording agent 204 as indicated in a block 522. The text recording agent 204 at block 522 receiving the sync frame events from the instrumented video encoder 202 at block 506, sends an English text stream to viewers over the network as indicated in a block 524. A computer 2 used for closed caption text entry 1, such as Spanish text as indicated in a block 526 provides closed caption text in English as indicated in a block 528 to the text recording agent 204 as indicated in a block 530. The text recording agent 204 at block 530 receiving the sync frame events from the instrumented video encoder 202 at block 506, sends a Spanish text stream to viewers over the network as indicated in a block 524.

Figure 6:
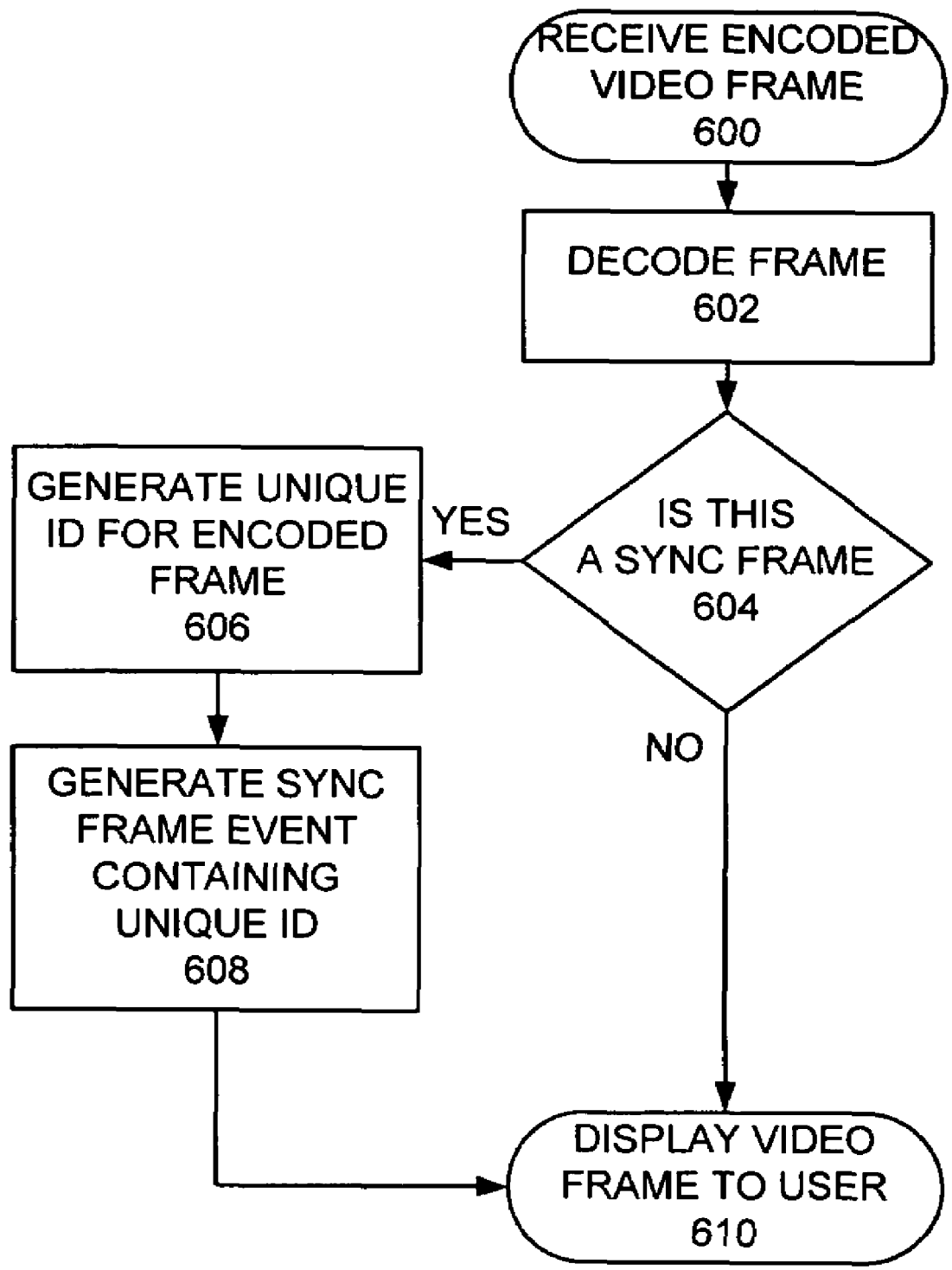
FIGS. 6 and 7 are functional block diagrams respectively illustrating an exemplary instrumented video decoder and an exemplary text display agent of the closed captioning apparatus of FIG. 2 in accordance with the preferred embodiment.
Figure 7:
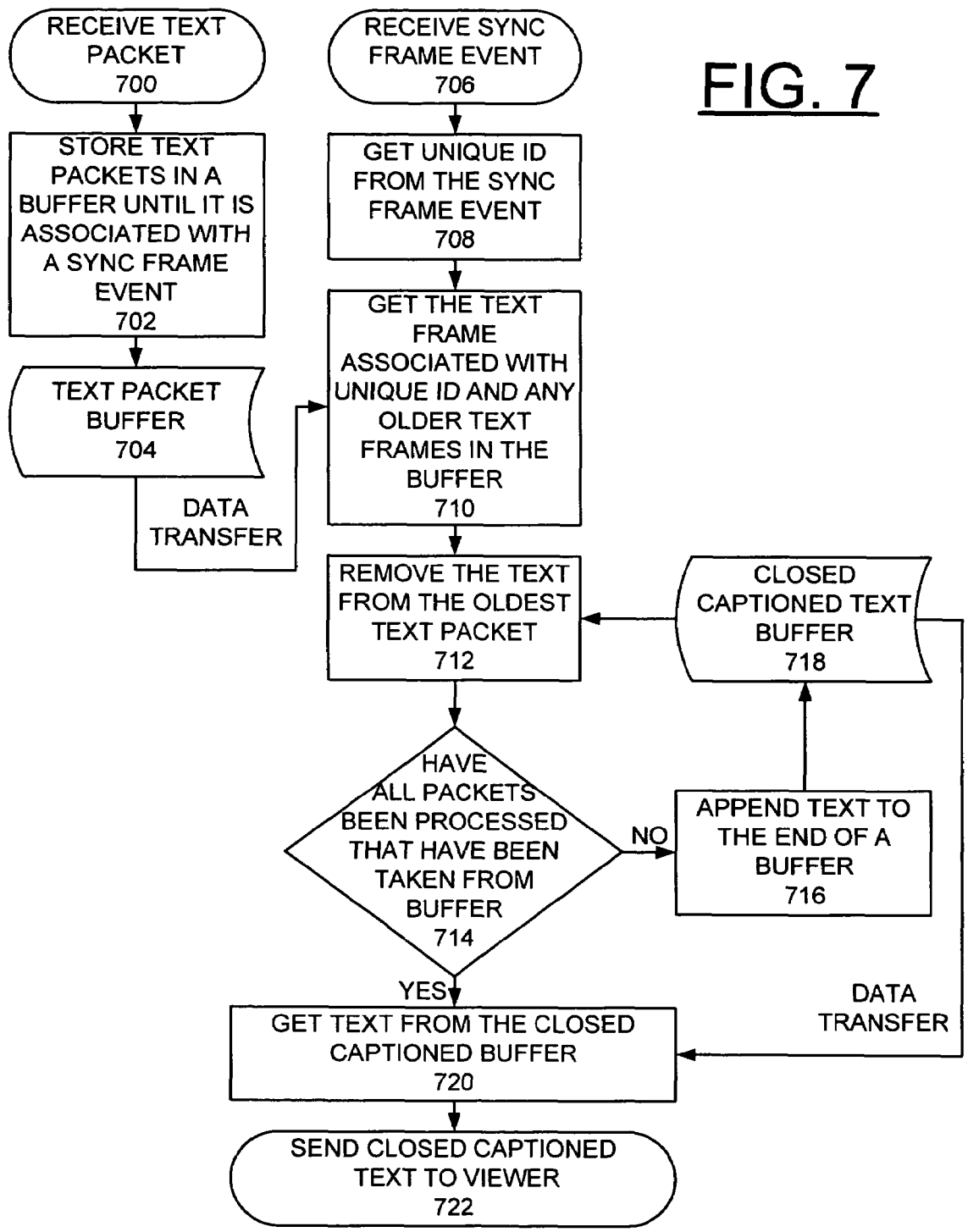

FIGS. 6 and 7 are functional block diagrams respectively illustrating an exemplary instrumented video decoder 210 and an exemplary text display agent 214 of the closed captioning apparatus 200 of FIG. 2 in accordance with the preferred embodiment.

Referring now to FIG. 6, the instrumented video decoder 210 receives an encoded video frame as indicated in a block 600, and decodes the frame as indicated in a block 602. Checking is performed to determine whether this is a sync frame as indicated in a decision block 604. If this is a sync frame, then a unique ID is generated for the encoded frame as indicated in a block 606. Then a sync frame event containing the unique ID is generated as indicated in a block 608. Then and when a sync frame not identified at decision block 604, the frame is displayed to the user as indicated in a block 610.

Referring now to FIG. 7, text display agent 214 receives a text packet as indicated in a block 700. As indicated in a block 702, the closed caption text is stored in a closed caption text buffer 704 until the closed caption text is associated with a sync frame event 206. Text display agent 214 receives a sync frame event as indicated in a block 706. The unique ID for the sync frame event is obtained as indicated in a block 708. Then a data transfer from the closed caption text buffer 704 is performed to obtain the text frame associated with the unique ID and any older text frames in the buffer as indicated in a block 710. The text from the oldest text packet is removed as indicated in a block 710. At block 710, the text frames should be pulled off the buffer 704 one by one in the order the text frames arrived. If a text frame is retrieved from the buffer 704 and older frames are identified, then a sync frame was somehow lost and these older frames are pulled from the buffer and displayed first, to make sure all the text is displayed and in order. Text display agent 214 checks to determine whether all packets removed from the buffer 704 have been processed as indicated in a decision block 714. If not, then as indicated in a block 716 the text is appended to the end of a buffer as indicated in a block 718. Then text from the oldest text packet is removed at block 712. Otherwise, when all packets removed from the buffer 704 have been processed, a data transfer is performed to get the text from the closed captioned buffer 718 as indicated in a block 720. Then the closed captioned text is sent to the viewer as indicated in a block 722.

Figure 8:
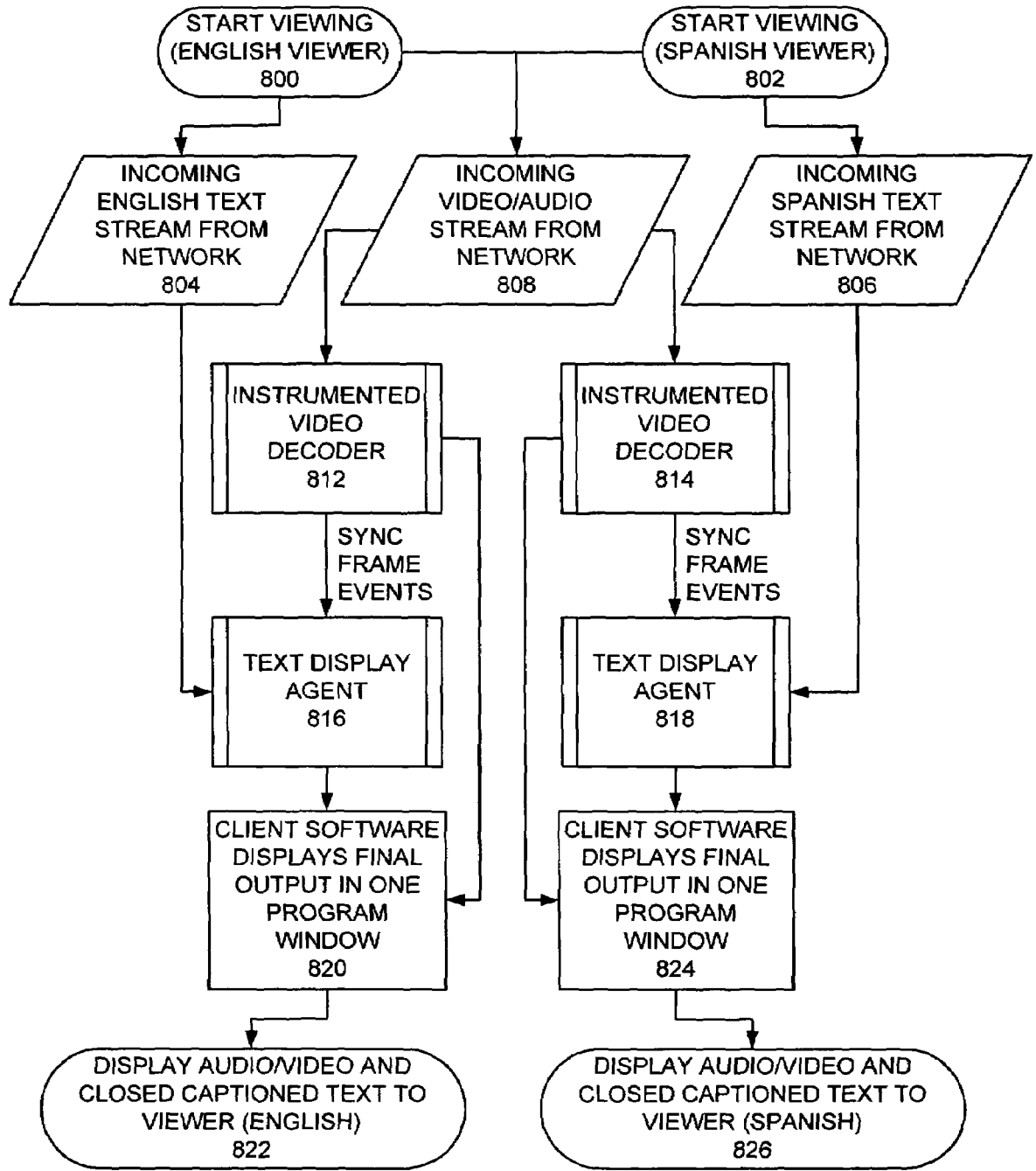
FIG. 8 is a flow chart illustrating exemplary steps for implementing closed captioning in accordance with the preferred embodiment.

Referring now to FIG. 8, there are shown exemplary steps to implement viewing of closed captioning video in accordance with the preferred embodiment starting at block 800, for example, for English viewer or starting at a block 802, for example, for Spanish viewer. An incoming English text stream is obtained from the network as indicated in a block 804. Similarly an incoming Spanish text stream is obtained from the network as indicated in a block 806. An incoming video/audio stream is obtained from the network as indicated in a block 808 and applied to a respective instrumented video decoder 210 as indicated in a respective block 812, 814. The respective instrumented video decoder 210 at blocks 812, 814 apply sync frame events to a respective text display agent 214 as indicated in a respective block 816, 818. The text display agents 214 at blocks 816, 818 respectively receive the incoming English and Spanish text stream at block 800, 802. A client software display final output in one program window as indicated in a block 820 and displays audio/video and closed captioned English text to the viewer as indicated in a block 822. A client software display final output in one program window as indicated in a block 824 and displays audio/video and closed captioned Spanish text to the viewer as indicated in a block 826.

Figure 9:
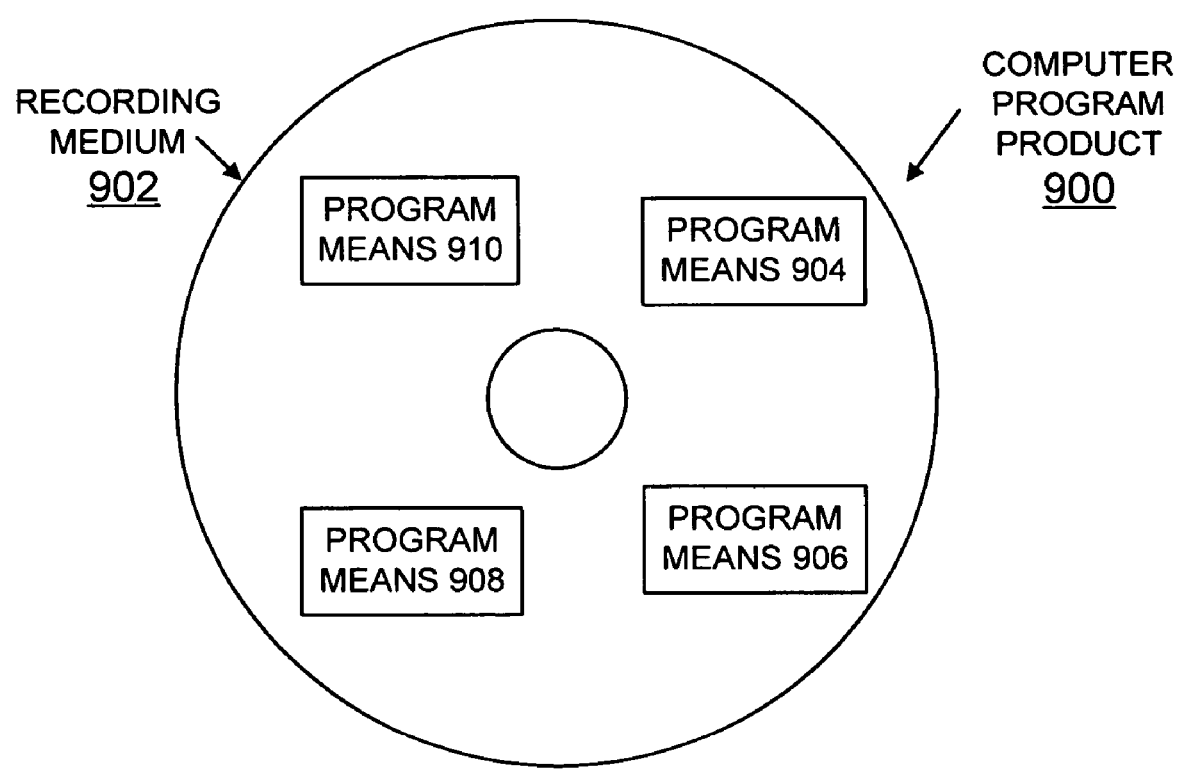
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 902 stores program means 904, 906, 908, 910 on the medium 902 for carrying out the methods for implementing closed captioning of the preferred embodiment in the system 200 of FIG. 2.

A sequence of program instructions or a logical assembly of one or more interrelated modules defined by the recorded program means 904, 906, 908, 910, direct the closed captioning system 200 for implementing closed captioning of the preferred embodiment.

While the present invention has been described with reference to the details of the embodiments of the invention shown in the drawing, these details are not intended to limit the scope of the invention as claimed in the appended claims.

What is claimed is:

1. Apparatus for synchronizing separate compressed video and text streams to provide closed captioning and instant messaging integration with video conferencing comprising:

a video encoder for encoding a video stream and periodically generating a synchronization frame event, each generated synchronization frame event having a unique ID;

a text recording agent coupled to said video encoder receiving said periodically generated synchronization frame event and for storing text and associating said stored text with said synchronization frame event;

a video decoder for decoding said video stream and periodically generating said synchronization frame event having said unique ID; and a text display agent coupled to said video decoder receiving said periodically generated synchronization frame event and for storing text packets and associating said stored text packet with said synchronization frame event.

2. Apparatus for synchronizing separate compressed video and text streams as recited in claim 1 wherein said video encoder includes an instrumented streaming video encoder.

3. Apparatus for synchronizing separate compressed video and text streams as recited in claim 1 wherein said video encoder identifies a key frame, and responsive to said identified key frame generates said synchronization frame event.

4. Apparatus for synchronizing separate compressed video and text streams as recited in claim 1 wherein said video decoder generates said synchronization frame event responsive to decoding said key frame.

5. Apparatus for synchronizing separate compressed video and text streams as recited in claim 1 wherein said video encoder inserts a synchronization frame into said video stream together with generating said synchronization frame event.

6. Apparatus for synchronizing separate compressed video and text streams as recited in claim 5 wherein said video decoder generates said synchronization frame event responsive to decoding said synchronization frame.

7. Apparatus for synchronizing separate compressed video and text streams as recited in claim 1 wherein said video encoder and said video decoder generating said synchronization frame event having said unique ID includes using a hashing algorithm.

8. Apparatus for synchronizing separate compressed video and text streams as recited in claim 1 wherein said video encoder and said video decoder generating said synchronization frame event having said unique ID includes receiving encoded frame data as an input.

9. Apparatus for synchronizing separate compressed video and text streams as recited in claim 1 wherein said video decoder includes an instrumented streaming video decoder.

10. Apparatus for synchronizing separate compressed video and text streams as recited in claim 1 wherein said text recording agent generates text packets, each text packet including said unique ID and said associated text and adds each said text packet to a text stream.

11. Apparatus for synchronizing separate compressed video and text streams as recited in claim 10 wherein said text display agent processes stored text packets and transfers text data for display with said decoded video.

12. Apparatus for synchronizing separate compressed video and text streams as recited in claim 1 includes a plurality of said text recording agents, each for sending a text stream in a selected language to viewers over a network.

13. A computer program product for synchronizing separate compressed video and text streams to provide closed captioning and instant messaging integration with video conferencing in an encoder and decoder system, said computer program product including instructions executed by the encoder and decoder system to cause the encoder and decoder system to perform the steps of:

encoding a video stream and periodically generating a synchronization frame event, each generated synchronization frame event having a unique ID;

receiving said periodically generated synchronization frame event and generating text packets including associating stored text with said synchronization frame event;

decoding said video stream and periodically generating said synchronization frame event having said unique ID;

receiving said periodically generated synchronization frame event; and associating said stored text packet with said synchronization frame event.

14. A computer program product for synchronizing separate compressed video and text streams as recited in claim 13 wherein generating said synchronization frame event having said unique ID includes receiving encoded frame data as an input.

15. A method for synchronizing separate compressed video and text streams to provide closed captioning and instant messaging integration with video conferencing comprising the steps of:

encoding a video stream and periodically generating synchronization frame events, each generated synchronization frame event having a unique ID;

providing a text recording agent for receiving said periodically generated synchronization frame event and generating text packets associating stored text with said synchronization frame events;

decoding said video stream and periodically generating said synchronization frame event having said unique ID; and providing a text display agent for receiving and storing text packets, receiving said periodically generated synchronization frame event and associating stored text packets with said synchronization frame events.

16. A method for synchronizing separate compressed video and text streams as recited in claim 15 wherein generating said synchronization frame event having said unique ID includes receiving encoded frame data as an input.

17. A method for synchronizing separate compressed video and text streams as recited in claim 16 further includes using a hashing algorithm for generating said synchronization frame event having said unique ID.

18. A method for synchronizing separate compressed video and text streams as recited in claim 15 includes providing an instrumented streaming video encoder for encoding said video stream and periodically generating synchronization frame events.

19. A method for synchronizing separate compressed video and text streams as recited in claim 15 includes providing an instrumented streaming video decoder for decoding said video stream and periodically generating synchronization frame events.

20. A method for synchronizing separate compressed video and text streams as recited in claim 15 includes providing a plurality of said text recording agents, each for sending a text stream in a selected language to viewers over a network.

* * * * *